US011939644B2

(12) United States Patent
Sun et al.

(10) Patent No.: US 11,939,644 B2
(45) Date of Patent: Mar. 26, 2024

(54) METHOD FOR REGENERATING COPPER-CONTAINING ALUMINUM ALLOY FROM ALUMINUM ALLOY SCRAP

(71) Applicant: The Boeing Company, Chicago, IL (US)

(72) Inventors: Zhi Sun, Beijing (CN); Chunwei Liu, Beijing (CN); Xuan Wei, Beijing (CN); Hongbin Cao, Beijing (CN); Pengcheng Yan, Beijing (CN)

(73) Assignee: The Boeing Company, Arlington, VA (US)

( * ) Notice: Subject to any disclaimer, the term of this patent is extended or adjusted under 35 U.S.C. 154(b) by 707 days.

(21) Appl. No.: 17/053,971

(22) PCT Filed: Jul. 25, 2019

(86) PCT No.: PCT/US2019/043333
§ 371 (c)(1),
(2) Date: Nov. 9, 2020

(87) PCT Pub. No.: WO2020/023689
PCT Pub. Date: Jan. 30, 2020

(65) Prior Publication Data
US 2021/0269893 A1  Sep. 2, 2021

(30) Foreign Application Priority Data
Jul. 26, 2018 (CN) .......................... 201810838171.X

(51) Int. Cl.
C22B 21/06 (2006.01)
C22B 21/00 (2006.01)
(Continued)

(52) U.S. Cl.
CPC ........ *C22B 21/068* (2013.01); *C22B 21/0007* (2013.01); *C22B 21/0092* (2013.01);
(Continued)

(58) Field of Classification Search
CPC .............. C22B 21/068; C22B 21/0007; C22B 21/0092; C22B 21/066; C22B 9/023;
(Continued)

(56) References Cited

U.S. PATENT DOCUMENTS

| 1,160,430 A | 11/1915 | Mellen |
| 6,355,090 B1 | 3/2002 | Ohyama et al. |

(Continued)

FOREIGN PATENT DOCUMENTS

| CA | 3071708 | 3/2019 |
| CN | 1760389 | 4/2006 |

(Continued)

OTHER PUBLICATIONS

CN-103173622-A Translation (Year: 2013).*
(Continued)

*Primary Examiner* — Brian D Walck
*Assistant Examiner* — Danielle Carda
(74) *Attorney, Agent, or Firm* — Walters & Wasylyna LLC

(57) ABSTRACT

A method for regenerating different types of copper-containing aluminum alloys using aluminum alloy scrap from aeronautical industry includes detecting a chemical composition of said aluminum alloy scrap and optionally adding a suitable amount of a metal or alloy additive according to a composition requirement of a target aluminum-copper alloy, thereby obtaining a mixture of aluminum alloy scrap and metal or alloy additive; vacuum smelting the mixture of aluminum alloy scrap and metal or alloy additive in a vacuum furnace, wherein impurities are removed and an aluminum alloy solution is formed; filtering the aluminum alloy solution using a filter to obtain a melt comprising a target aluminum alloy composition; and casting the target aluminum alloy composition from said melt.

20 Claims, 1 Drawing Sheet

(51) Int. Cl.
*C22C 1/02* (2006.01)
*C22C 21/14* (2006.01)
*C22C 21/16* (2006.01)
*C22C 21/18* (2006.01)

(52) U.S. Cl.
CPC ............ *C22B 21/066* (2013.01); *C22C 1/026* (2013.01); *C22C 21/14* (2013.01); *C22C 21/16* (2013.01); *C22C 21/18* (2013.01)

(58) Field of Classification Search
CPC ......... C22C 1/026; C22C 21/14; C22C 21/16; C22C 21/18; Y02P 10/20
USPC .......................................................... 75/412
See application file for complete search history.

(56) References Cited

U.S. PATENT DOCUMENTS

| | | | | |
|---|---|---|---|---|
| 6,607,578 | B2 * | 8/2003 | Otaki | ............... C22B 26/22 75/600 |
| 2017/0073802 | A1 | 3/2017 | Hori et al. | |

FOREIGN PATENT DOCUMENTS

| | | | | |
|---|---|---|---|---|
| CN | 103173622 | | 6/2013 | |
| CN | 103173622 A | * | 6/2013 | |
| CN | 103668161 | | 3/2014 | |
| CN | 103950961 | | 7/2014 | |
| CN | 104532036 | | 4/2015 | |
| CN | 106521197 | | 3/2017 | |
| CN | 107 541 610 | | 1/2018 | |
| CN | 107653388 | | 2/2018 | |
| CN | 106521197 B | * | 7/2018 | ........... B22D 11/003 |
| CN | 109 536 750 | | 3/2019 | |
| EP | 0 853 131 | | 7/1998 | |
| EP | 853131 A1 | * | 7/1998 | .......... B01F 13/0809 |
| EP | 1689896 | | 8/2006 | |
| EP | 2038440 | | 3/2009 | |
| EP | 3169819 | | 5/2017 | |

OTHER PUBLICATIONS

CN-106521197-B Translation (Year: 2018).*
China National Intellectual Property Administration, Office Action, with English translation, App. No. 201810838171X (dated Jul. 12, 2021).
International Searching Authority: International Search Report and Written Opinion, Intl. App. No. PCT/2018/043333 (dated Oct. 22, 2019).
China National Intellectual Property Administration, Office Action, with English translation, App. No. 201810838171.X (dated Nov. 15, 2021).
China National Intellectual Property Administration, Office Action, with English translation, App. No. 201810838171.X (dated Feb. 17, 2022).

* cited by examiner

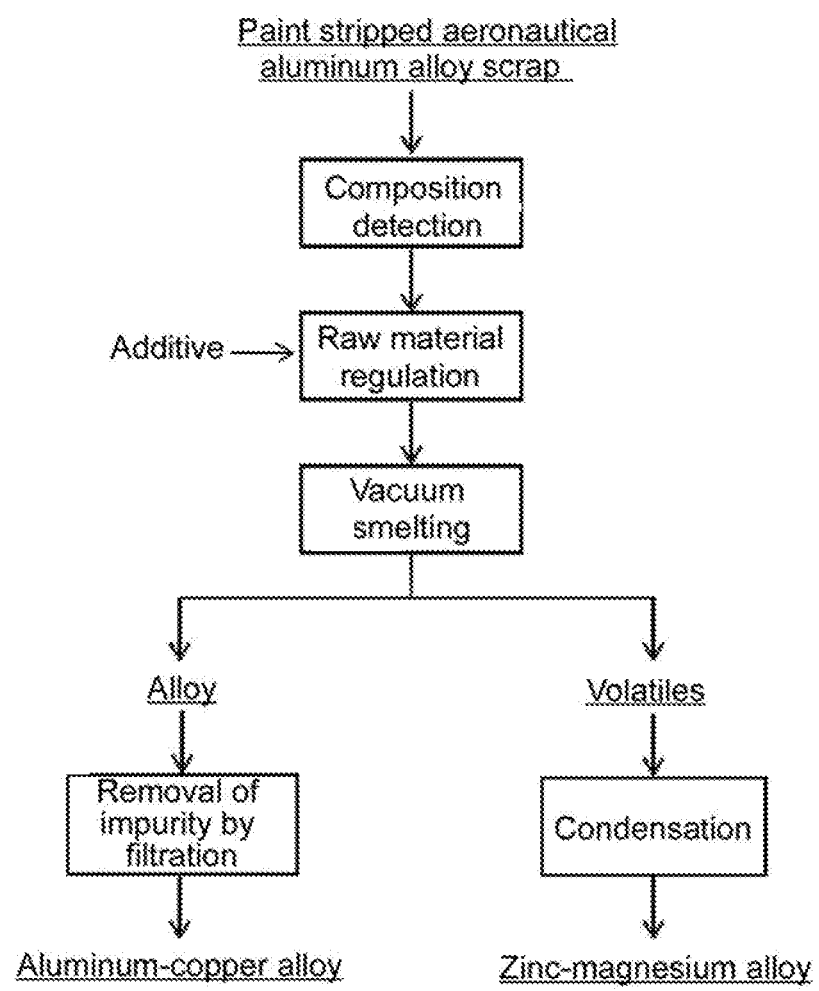

METHOD FOR REGENERATING COPPER-CONTAINING ALUMINUM ALLOY FROM ALUMINUM ALLOY SCRAP

PRIORITY

This application is a U.S. national phase application of Intl. App. No. PCT/US2019/043333 filed on Jul. 25, 2019, which claims priority from Chinese Pat. App. No. 201810838171X filed on Jul. 26, 2018.

FIELD

The present disclosure relates to a method for regenerating a copper-containing aluminum alloy from aluminum alloy scrap.

BACKGROUND

In the past decades, the output of primary aluminum increased rapidly in the world. Data shows that the output of primary aluminum in the world was less than 20 million tons in 1997, while the output increased to 57 million tons in 2016. 2xxx series and 7xxx series aluminum alloys are widely applied to structural materials of aircrafts due to their good mechanical properties, mature processing technology and reliable detection means. This has led to the revolutionary change of the structure and performance of aircrafts.

TABLE 1

Compsitions of 2xxx series and 7xxx series aluminum alloys (weight percentage)

| alloy | Cu | Zn | Mg | Mn | Cr (max) | Si (max) | Fe (max) | Zr (max) |
|---|---|---|---|---|---|---|---|---|
| 7xxx* | 0.2-2.6 | 3.4-8.2 | 1.9-3.7 | 0.1-0.6 | 0.28 | 0.4 | 0.5 | 0.25 |
| 2xxx* | 2.2-5 | 0.25-0.3 | 0.2-1.8 | 0.2-1.2 | 0.1 | 0.5 | 0.5 | 0.2 |

The compositions of the 2xxx series and 7xxx series aluminum alloys are as shown in Table 1. The main alloy components of the 2xxx series aluminum alloys are copper and magnesium, and the main alloy components of the 7 series aluminum alloys are zinc, magnesium and copper. The 2xxx series aluminum alloys have a higher tensile strength, as well as excellent heat resistance and fatigue property at room temperature. In addition, after heat treatment, these alloys have improved plasticity, fatigue life, fracture toughness, and excellent resistance to fatigue fracture propagation. Therefore, these alloys can be used in formation of a fuselage, wing, shear resistant ribbed plate and web, and other structural members having high strength requirements. In general, the 7xxx series aluminum alloys have a high specific strength and hardness, better corrosion resistance and higher toughness, and superior processability, and therefore are widely applied to important loaded parts in aircraft structure such as an aircraft skin, a spar, a frame, a stringer, a landing gear, hydraulic system components and the like.

As many mechanism parts of aircrafts need to be produced by mechanical processing of a bigger part as a whole, the process may inevitably generate a lot of mechanical chips and off-cuts. In addition, as aircrafts exceed the service life, a large number of disused aircrafts are accumulated. These aluminum alloy chips, off-cuts and disused aircrafts can be recycled as secondary aluminum resources. Compared to the production of primary aluminum, producing regenerated aluminum from secondary aluminum resources can not only save bauxite resources, but also remarkably reduce the energy consumption, thereby having positive effects on alleviating energy crisis and reducing environmental burden.

It can be predicted that with the vigorous development of the aeronautical industry today, more and more secondary aluminum resources will be accumulated and become a new type of "city mine." Exploitation of a novel process of economical benefit for recycling aeronautical waste aluminum alloys is an important field of comprehensive utilization of "city mine" resource.

However, aeronautical aluminum alloy scrap is generally obtained by mixing scrap from different parts, and therefore has alloy components with a high content and has a complex constitution, resulting in that regulation of composition and constitution thereof is difficult and the recovery economy technology is of high cost. The 2xxx series copper-containing aluminum alloys are well-developed and widely used, and regeneration of the 2xxx series copper-containing aluminum alloys from aeronautical aluminum alloy scrap by controlling recovery processing conditions has a higher economic efficiency and applicability. Comparison of the composition between the 2xxx series aluminum alloys and the 7xxx series aluminum alloys shows that the technical difficulty that needs to be solved in the regeneration of the 2xxx series copper-containing aluminum alloys is to achieve quantitative and effective regulation of the content of zinc, copper and magnesium.

There are few domestic reports on patent technologies for aeronautical aluminum recycling, which may be related to the fact that domestic aeronautical aluminum alloy scrap has a small cumulative stock and has not yet reached a large scale. In 2007, Alcan Rhenalu company in France filed an Europe patent application (EP 2038440 AO) titled "Process for Recycling Aluminum Alloy Scrap Coming from the Aeronautical Industry," and filed an international patent application (PCT/FR2007/001005) via PCT route, which discloses a method for recovering aluminum alloy scrap from the aeronautical industry, wherein iron and silicon in the 2xxx series or 7xxx series alloy scrap are purified through fractional crystallization, but other elements such as zinc, copper and magnesium are not removed. In 2015, Constellium, an aluminum company in France, filed a Europe patent application (EP 3169819 A2), and filed an international patent application (PCT/FR2015/051926) via PCT route. The patent reported a method for preparing an aluminum alloy ingot by using 2111 or 7xxx series aluminum alloy scrap containing lithium in an amount of more than 0.2 weight % or more than 0.5 weight %, wherein the lithium oxidation problem is solved through wet metallurgy process, while the contents of unwanted impurities, in particular alkali metal elements (such as sodium), alkali earth metal elements (such as calcium) or certain metals (such as iron) are reduced. However, the patent did not report a step for smelting the series aluminum alloys of the used scrap.

Hence, the existing recycling technology concentrates on the removal of some alloy elements from the aeronautical aluminum alloy scrap, and the regeneration of aluminum alloy products has not been involved. Considering the development potential of the aeronautical industry, there is an urgent need to develop a new short-term and effective technology for regenerating different types of 2xxx series copper-containing aluminum alloys from aluminum alloy scrap from the aeronautical industry, in particular to achieve quantitative and effective regulation of the content of zinc, copper and magnesium, by combining melt stirring/flowing, vacuum degree regulation, and alloy composition control.

SUMMARY

In one example, the disclosed method for regenerating different types of copper-containing aluminum alloys using aluminum alloy scrap includes steps of (1) detecting a chemical composition of the aluminum alloy scrap and optionally adding a suitable amount of a metal or alloy additive according to a composition requirement of a target aluminum-copper alloy, thereby obtaining a mixture of aluminum alloy scrap and metal or alloy additive; (2) vacuum smelting the mixture of aluminum alloy scrap and metal or alloy additive in a vacuum furnace, wherein impurities are removed and an aluminum alloy solution is formed; (3) filtering the aluminum alloy solution using a filter to obtain a melt comprising a target aluminum alloy composition; and (4) casting the target aluminum alloy composition from the melt.

Other examples of the disclosed method for regenerating different types of copper-containing aluminum alloys using aluminum alloy scrap will become apparent from the following detailed description, the accompanying drawing and the appended claims.

BRIEF DESCRIPTION OF THE DRAWING

FIG. 1 is a flow chart of the overall process of the embodiments herein.

DETAILED DESCRIPTION

Disclosed is a method for regenerating different types of copper-containing aluminum alloys using aluminum alloy scrap, such as aluminum alloy scrap from the aeronautical industry. In one example, the disclosed method includes steps of (1) detecting a chemical composition of the aluminum alloy scrap and optionally adding a suitable amount of a metal or alloy additive according to a composition requirement of a target aluminum-copper alloy, thereby obtaining a mixture of aluminum alloy scrap and metal or alloy additive; (2) vacuum smelting the mixture of aluminum alloy scrap and metal or alloy additive in a vacuum furnace, wherein impurities are removed and an aluminum alloy solution is formed; (3) filtering the aluminum alloy solution using a filter to obtain a melt comprising a target aluminum alloy composition; and (4) casting the target aluminum alloy composition from the melt.

The type of the metal or alloy additive in the detecting step is, for example, metallic copper, copper-manganese alloy, copper-silicon alloy, copper-iron alloy, copper-chromium alloy, copper-magnesium alloy. According to the target alloy composition, any one or a combination of at least two can be selected, and the selected additive is, for example, metallic copper, a combination of copper-manganese alloy and copper-magnesium alloy, a combination of copper-silicon and a copper-chromium alloy, and the like.

In embodiments, the content of the additive in step (1) is dependent on the actual composition of the scrap from aeronautical industry, and the additive is added before the smelting, the amount being 0 to 8% based on the total weight of the alloy scrap, such as 0.5%, 1.5%, 2.5%, 4%, 6% and the like.

The vacuum distillation or vacuum smelting is a key step for removing zinc or other impurities. In the vacuum smelting, impurity removal from the aluminum alloy and alloying can be implemented simultaneously, by combining the melt stirring/flowing, vacuum degree regulation and temperature holding time regulation; the melt stirring is implemented by means of mechanical agitation or electromagnetic induction, or by means of electromagnetic stirring.

In embodiments, the vacuum degree is controlled to 100 Pa or less to achieve distillation of the impurity elements (such as zinc and magnesium) and removal of the gas enclosed in the melt simultaneously, without additional degasification;

In embodiments, the smelting temperature is controlled in the range of 700 to –1300° C., for example 700° C., 800° C., 900° C., 1000° C., 1100° C., 1200° C., 1300° C. and the like. The smelting temperature should be as low as possible in order to reduce the energy consumption, provided that the alloy is fully molten.

In embodiments, the temperature holding time is 60 to 180 min, for example, 60 min, 100 min, 120 min, 150 min and the like. The holding temperature should be as low as possible in order to reduce the energy consumption, provided that the alloy is fully molten.

Volatilized elements such as zinc and magnesium can be recovered in step (2). The zinc-magnesium alloy can be recovered by condensation and liquefaction from the raw scrap, and the recovered alloy used for other purposes.

In embodiments, the condensation and liquefaction can be implemented by placing a condensate pan over the alloy. The condensate pan can be made of graphite or stainless steel.

A ceramic foam or other like filter is used to filtrate the aluminum alloy solution, so as to remove nonmetallic inclusions such as magnesia, alumina, silicon oxide and the like resulted from oxidization.

In embodiments, a ceramic foam filter can be used for the filtration.

In one technical solution, the method for regenerating a copper-containing aluminum alloy from mixed alloys of 2xxx series and 7xxx series comprises the following steps.

Step 1. The chemical composition of waste materials is detected, metallic copper is added in a weight percentage of 0.5-0.8% according to the composition requirement of the target aluminum-copper alloy, and the starting materials are dispersed as uniformly as possible.

Step 2. The mixture of the scrap and the metal or alloy additive is molten in a vacuum induction furnace, and the vacuum degree is controlled to about 100 Pa, or about 30 Pa or less to achieve distillation of impurity elements and removal of the gas enclosed in the melt simultaneously, without additional degasification. The smelting temperature is controlled in the range of 800 to 1100° C., and the reaction time depends on the amount of the materials and the original content of zinc, which is generally 60 to 180 min so as to achieve homogenization and alloying. Zinc and magnesium in the aluminum alloy melt are converted into liquid state by means of a graphite condensate pan to obtain the impurity alloy.

Step 3. A ceramic foam filter is used to filtrate the aluminum alloy solution, so as to remove magnesia, alumina, silicon oxide and the like generated by oxidization in the process.

Step 4. A semi-continuous casting machine is used to perform casting, so as to obtain an ingot having fine crystal grains.

In one example, the composition of the ingot can satisfy the requirements of different types of 2xxx series aluminum alloys.

Compared to what is known, embodiments herein have at least the following beneficial effects.

Beneficial Effect 1. Embodiments herein implement impurity removal from aluminum alloy and alloying simultaneously, by combining melt stirring/flowing, vacuum degree regulation and temperature holding time regulation, which is short-term and effective, is easy for industrial application, and has high use value;

Beneficial Effect 2. The recovery process makes full use of alloy components with a higher content in the waste aluminum alloys from aeronautical industry. There is no need to add a large amount of pure aluminum to perform dilution. Only by controlling the type and amount of the additive and the smelting conditions, the prepared aluminum alloys can satisfy the composition requirements of different types of 2xxx series aluminum alloys, and can be used directly;

Beneficial Effect 3. Elements volatilized in the recovery process can be recovered in an alloy form by condensation, not only the recovery cost can be saved, but also the damage to ambient environment caused by the volatiles can be avoided.

In order to better illustrate the method herein and facilitate understanding of the technical solution involved, embodiments herein will be further described below in conjunction with examples, although the method herein is not limited to the following examples.

Example 1

A suitable amount of paint stripped aeronautical aluminum alloy scrap is simply molten. Upon detection by ICP-OES, the main alloy components in the original aluminum alloys are as shown in Table 2.

According to the composition requirement of a target alloy, aluminum alloy 2024, pure copper in a mass percentage of 0.8% is weighed and added to the mixed alloys.

The materials are charged into a high purity graphite crucible, an induction furnace is vacuumized to an internal pressure less than 30 Pa, and the materials are heated and molten in the induction furnace having a built-in graphite condensate pan, at a temperature of 780° C. The frequency of the induction furnace is controlled, so as to stir the melt. In the process, zinc and magnesium are separated from the aluminum alloy melt in a steam form, and volatilized to the condensate pan over the melt, and condensed.

After 60 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 2, and satisfies the composition requirement of the 2024 aluminum alloy in "GB/T3190-2008 wrought aluminum and aluminum alloy chemical composition."

TABLE 2

Compositions of mixed aeronautical aluminum alloy scrap, regenerated aluminum-copper alloy and 2024 aluminum alloy (weight percentage)

| | Cu | Zn | Mg | Mn | Cr | Si | Fe |
|---|---|---|---|---|---|---|---|
| original composition | 3.52 | 1.19 | 1.39 | 0.45 | 0.07 | 0.19 | 0.28 |
| final composition | 4.40 | 0.15 | 1.31 | 0.49 | 0.05 | 0.33 | 0.21 |
| 2024-Al | 3.80-4.90 | <0.25 | 1.20-1.80 | 0.30-0.90 | <0.10 | <0.50 | <0.50 |

Example 2

A suitable amount of paint stripped aeronautical aluminum alloy scrap is simply molten. Upon detection by ICP-OES, the main alloy components in the original aluminum alloys are as shown in Table 3.

According to the composition requirement of a target alloy, aluminum alloy 2014, copper-magnesium alloy in a mass percentage of 2.5% is weighed, and added to mixed alloys.

The materials are charged into a high purity graphite crucible, an induction furnace is vacuumized to an internal pressure less than 25 Pa, and the materials are heated and molten in the induction furnace having a built-in graphite condensate pan, at a temperature of 900° C. The frequency of the induction furnace is controlled, so as to stir the melt. In the process, zinc and magnesium are separated from the aluminum alloy melt in a steam form, and volatilized to the condensate pan over the melt, and condensed.

After 120 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 3, and satisfies the composition requirement of the 2014 aluminum alloy in "GB/T3190-2008 wrought aluminum and aluminum alloy chemical composition."

TABLE 3

Compositions of mixed aeronautical aluminum alloy scrap, regenerated aluminum-copper alloy and 2014 aluminum alloy (weight percentage)

| | Cu | Zn | Mg | Mn | Cr | Si | Fe |
|---|---|---|---|---|---|---|---|
| original composition | 2.73 | 2.85 | 1.92 | 0.50 | 0.09 | 0.69 | 0.23 |
| final composition | 4.31 | 0.17 | 0.72 | 0.51 | 0.09 | 0.68 | 0.25 |
| 2014-Al | 3.90-5.00 | <0.25 | 0.20-0.80 | 0.40-1.20 | <0.10 | 0.50-1.20 | <0.70 |

Example 3

A suitable amount of paint stripped aeronautical aluminum alloy scrap is simply molten. Upon detection by ICP-OES, the main alloy components in the original aluminum alloys are as shown in Table 4.

According to the composition requirement of a target alloy, aluminum alloy 2219, copper-chromium alloy in a mass percentage of 3.0% is weighed, and added to mixed alloys.

The materials are charged into a high purity graphite crucible, an induction furnace is vacuumized to an internal pressure less than 10 Pa, and the materials are heated and molten in the induction furnace having a built-in graphite condensate pan, at a temperature of 1030° C. The frequency of the induction furnace is controlled, so as to stir the melt. In the process, zinc and magnesium are separated from the aluminum alloy melt in a steam form, and volatilized to the condensate pan over the melt, and condensed.

After 180 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 4, and satisfies the composition requirement of the 2219 aluminum alloy in "GB/T3190-2008 wrought aluminum and aluminum alloy chemical composition."

TABLE 4

Compositions of mixed aeronautical aluminum alloy scrap, regenerated aluminum-copper alloy and 2219 aluminum alloy (weight percentage)

| | Cu | Zn | Mg | Mn | Cr | Si | Fe |
|---|---|---|---|---|---|---|---|
| original composition | 3.10 | 2.22 | 1.85 | 0.35 | 0.07 | 0.15 | 0.18 |
| final composition | 6.10 | 0.03 | 0.01 | 0.37 | 0.09 | 0.16 | 0.18 |
| 2219-Al | 5.80-6.80 | <0.10 | <0.02 | 0.20-0.40 | — | <0.20 | <0.30 |

Example 4

A suitable amount of paint stripped aeronautical aluminum alloy scrap is simply molten. Upon detection by ICP-OES, the main alloy components in the original aluminum alloys are as shown in Table 5.

According to the composition requirement of a target alloy, aluminum alloy 2117, pure copper in a mass percentage of 0.7% is weighed, and added to mixed alloys.

The materials are charged into a high purity graphite crucible, an induction furnace is vacuumized to an internal pressure less than 10 Pa, and the materials are heated and molten in the induction furnace having a built-in graphite condensate pan, at a temperature of 1000° C. The frequency of the induction furnace is controlled, so as to stir the melt. In the process, zinc and magnesium are separated from the aluminum alloy melt in a steam form, and volatilized to the condensate pan over the melt, and condensed.

After 120 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 5, and satisfies the composition requirement of the 2117 aluminum alloy in "GB/T3190-2008 wrought aluminum and aluminum alloy chemical composition."

TABLE 5

Compositions of mixed aeronautical aluminum alloy scrap, regenerated aluminum-copper alloy and 2117 aluminum alloy (weight percentage)

| | Cu | Zn | Mg | Mn | Cr | Si | Fe |
|---|---|---|---|---|---|---|---|
| original composition | 1.86 | 3.32 | 2.33 | 0.16 | 0.06 | 0.22 | 0.20 |
| final composition | 2.60 | 0.13 | 0.32 | 0.16 | 0.05 | 0.24 | 0.18 |

TABLE 5-continued

Compositions of mixed aeronautical aluminum alloy scrap, regenerated aluminum-copper alloy and 2117 aluminum alloy (weight percentage)

| | Cu | Zn | Mg | Mn | Cr | Si | Fe |
|---|---|---|---|---|---|---|---|
| composition 2117-Al | 2.2-3.0 | <0.25 | 0.20-0.50 | <0.20 | <0.10 | <0.80 | <0.70 |

Example 5

A suitable amount of paint stripped aeronautical aluminum alloy scrap is simply molten. Upon detection by ICP-OES, the main alloy components in the original aluminum alloys are as shown in Table 6.

According to the composition requirement of a target alloy, aluminum alloy 2218, pure copper in a mass percentage of 1.0% is weighed, and added to mixed alloys.

The materials are charged into a high purity graphite crucible, an induction furnace is vacuumized to an internal pressure less than 30 Pa, and the materials are heated and molten in the induction furnace having a built-in graphite condensate pan, at a temperature of 1100° C. The frequency of the induction furnace is controlled, so as to stir the melt. In the process, zinc and magnesium are separated from the aluminum alloy melt in a steam form, and volatilized to the condensate pan over the melt, and condensed.

After 60 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 6, and satisfies the composition requirement of the 2218 aluminum alloy in "GB/T3190-2008 wrought aluminum and aluminum alloy chemical composition."

TABLE 6

Compositions of mixed aeronautical aluminum alloy scrap, regenerated aluminum-copper alloy and 2218 aluminum alloy (weight percentage)

| | Cu | Zn | Mg | Mn | Cr | Si | Fe |
|---|---|---|---|---|---|---|---|
| original composition | 3.15 | 1.42 | 1.88 | 0.11 | 0.08 | 0.15 | 0.68 |
| final composition | 4.11 | 0.09 | 1.21 | 0.10 | 0.07 | 0.16 | 0.70 |
| 2218-Al | 3.50-4.50 | <0.25 | 1.20-1.80 | <0.20 | <0.10 | <0.90 | <1.00 |

Example 6

A suitable amount of paint stripped aeronautical aluminum alloy scrap is simply molten. Upon detection by ICP-OES, the main alloy components in the original aluminum alloys are as shown in Table 7.

According to the composition requirement of a target alloy, aluminum alloy 2024, copper-magnesium alloy in a mass percentage of 3.0% is weighed, and added to mixed alloys.

The materials are charged into a high purity graphite crucible, an induction furnace is vacuumized to an internal pressure less than 10 Pa, and the materials are heated and molten in the induction furnace having a built-in graphite condensate pan, at a temperature of 900° C. The frequency of the induction furnace is controlled, so as to stir the melt. In the process, zinc and magnesium are separated from the aluminum alloy melt in a steam form, and volatilized to the condensate pan over the melt, and condensed.

After 100 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 7, and satisfies the composition requirement of the 2024 aluminum alloy in "GB/T3190-2008 wrought aluminum and aluminum alloy chemical composition."

TABLE 7

Compositions of mixed aeronautical aluminum alloy scrap, regenerated aluminum-copper alloy and 2024 aluminum alloy (weight percentage)

|  | Cu | Zn | Mg | Mn | Cr | Si | Fe |
|---|---|---|---|---|---|---|---|
| original composition | 1.66 | 3.21 | 3.49 | 0.46 | 0.07 | 0.23 | 0.32 |
| final composition | 4.30 | 0.20 | 1.66 | 0.50 | 0.07 | 0.22 | 0.34 |
| 2024-Al | 3.80-4.90 | <0.25 | 1.20-1.80 | 0.30-0.90 | <0.10 | <0.50 | <0.50 |

Example 7

A suitable amount of paint stripped aeronautical aluminum alloy scrap is simply molten. Upon detection by ICP-OES, the main alloy components in the original aluminum alloys are as shown in Table 8.

According to the composition requirement of a target alloy, aluminum alloy 2024, copper-magnesium alloy in a mass percentage of 3.5% is weighed, and added to mixed alloys.

The materials are charged into a high purity graphite crucible, an induction furnace is vacuumized to an internal pressure less than 20 Pa, and the materials are heated and molten in the induction furnace having a built-in graphite condensate pan, at a temperature of 1050° C. The frequency of the induction furnace is controlled, so as to stir the melt. In the process, zinc and magnesium are separated from the aluminum alloy melt in a steam form, and volatilized to the condensate pan over the melt, and condensed.

After 100 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 8, and satisfies the composition requirement of the 2024 aluminum alloy in "GB/T3190-2008 wrought aluminum and aluminum alloy chemical composition."

TABLE 8

Compositions of mixed aeronautical aluminum alloy scrap, regenerated aluminum-copper alloy and 2024 aluminum alloy (weight percentage)

|  | Cu | Zn | Mg | Mn | Cr | Si | Fe |
|---|---|---|---|---|---|---|---|
| original composition | 2.44 | 3.54 | 2.98 | 0.56 | 0.08 | 0.16 | 0.28 |
| final composition | 4.15 | 0.09 | 1.52 | 0.55 | 0.06 | 0.13 | 0.25 |
| 2024-Al | 3.80-4.90 | <0.25 | 1.20-1.80 | 0.30-0.90 | <0.10 | <0.50 | <0.50 |

Example 8

A suitable amount of paint stripped aeronautical aluminum alloy scrap is simply molten. Upon detection by ICP-OES, the main alloy components in the original aluminum alloys are as shown in Table 9.

According to the composition requirement of a target alloy, aluminum alloy 2218, copper-magnesium alloy in a mass percentage of 3.5% is weighed, and added to mixed alloys.

The materials are charged into a high purity graphite crucible, an induction furnace is vacuumized to an internal pressure less than 20 Pa, and the materials are heated and molten in the induction furnace having a built-in graphite condensate pan, at a temperature of 1000° C. The frequency of the induction furnace is controlled, so as to stir the melt. In the process, zinc and magnesium are separated from the aluminum alloy melt in a steam form, and volatilized to the condensate pan over the melt, and condensed.

After 90 min, a ceramic foam filter is used to filtrate the aluminum alloy solution, and then the filtrated aluminum alloy is subjected to semi-continuous casting to obtain an ingot. Upon detection, the chemical composition of the ingot is as shown in Table 9, and satisfies the composition requirement of the 2218 aluminum alloy in "GB/T3190-2008 wrought aluminum and aluminum alloy chemical composition."

TABLE 9

Compositions of mixed aeronautical aluminum alloy scrap, regenerated aluminum-copper alloy and 2218 aluminum alloy (weight percentage)

|  | Cu | Zn | Mg | Mn | Cr | Si | Fe |
|---|---|---|---|---|---|---|---|
| original composition | 1.28 | 2.52 | 2.04 | 0.15 | 0.09 | 0.36 | 0.77 |
| final composition | 3.86 | 0.10 | 1.55 | 0.14 | 0.07 | 0.33 | 0.72 |
| 2218-Al | 3.50-4.50 | <0.25 | 1.20-1.80 | <0.20 | <0.10 | <0.90 | <1.00 |

What is claimed is:

1. A method for regenerating different types of copper-containing aluminum alloys using aluminum alloy scrap, said method comprising:
   detecting a chemical composition of said aluminum alloy scrap and adding a suitable amount of a metal or alloy additive according to a composition requirement of a target aluminum-copper alloy, thereby obtaining a mixture of aluminum alloy scrap and metal or alloy additive;
   vacuum smelting the mixture of aluminum alloy scrap and metal or alloy additive in a vacuum furnace, wherein impurities are removed and an aluminum alloy solution is formed;

filtering the aluminum alloy solution using a filter to obtain a melt comprising a target aluminum alloy composition; and casting the target aluminum alloy composition from said melt, wherein the metal or alloy additive is added with the aluminum alloy scrap before the step of vacuum smelting the mixture of aluminum alloy scrap and metal or alloy additive.

2. The method according to claim 1, wherein a content of the metal or alloy additive during detecting is determined by an actual composition of said aluminum alloy scrap.

3. The method according to claim 1, wherein said metal or alloy additive is selected from one or more of the group consisting of a metallic copper, copper-manganese alloy, copper-silicon alloy, copper-iron alloy, copper-chromium alloy, and copper-magnesium alloy.

4. The method according to claim 1, wherein said metal or alloy additive is present in the mixture in a non-zero amount up to about 8% based on the total weight of the aluminum alloy scrap.

5. The method according to claim 4, wherein said metal or alloy additive is present in the mixture in a non-zero amount up to about 6% based on the total weight of the aluminum alloy scrap.

6. The method according to claim 1, wherein during vacuum smelting, melt stirring is implemented by means of mechanical agitation, electromagnetic induction, or electromagnetic stirring.

7. The method according to claim 1, wherein during vacuum smelting, a vacuum degree is controlled to 100 Pa or less to achieve distillation of impurity elements and removal of gas without additional de gasification.

8. The method according to claim 7, wherein said vacuum degree is controlled to 30 Pa or less.

9. The method according to claim 1, wherein during vacuum smelting, a smelting temperature is controlled in a range of 700 to 1300° C.

10. The method according to claim 9, wherein said smelting temperature is controlled in a range of 800 to 1100° C.

11. The method according to claim 1, wherein during vacuum smelting, a temperature holding time is 60 to 180 min.

12. The method according to claim 1, wherein during vacuum smelting, zinc is removed.

13. The method according to claim 1, wherein filtering is performed using a ceramic foam filter.

14. The method according to claim 1, wherein during filtering, nonmetallic inclusions are removed from said melt.

15. The method according to claim 14, wherein said nonmetallic inclusions are selected from the group consisting of magnesia, alumina, and silicon oxide.

16. The method according to claim 1, wherein said casting is performed using a semi-continuous casting machine.

17. The method according to claim 1, wherein after said casting, an ingot having fine crystal grains is formed.

18. The method according to claim 1, wherein prior to detecting, the aluminum alloy scrap is stripped of any paint.

19. The method according to claim 1, wherein during vacuum smelting, magnesium is removed.

20. A method for generating an aluminum-copper alloy using aluminum alloy scrap, said method comprising:

detecting a chemical composition of the aluminum alloy scrap and adding a suitable amount of copper or copper alloy according to a composition requirement of a target aluminum-copper alloy;

vacuum smelting the aluminum alloy scrap and the copper or copper alloy in a vacuum furnace, wherein at least one of zinc and magnesium is removed and an aluminum-copper alloy solution is formed;

filtering the aluminum-copper alloy solution using a filter to obtain an aluminum-copper alloy melt comprising the target aluminum-copper alloy; and casting the target aluminum-copper alloy from said melt, wherein the copper or copper alloy is added with the aluminum alloy scrap before the step of vacuum smelting the aluminum alloy scrap and the copper or copper alloy.

* * * * *